US009535805B2

(12) United States Patent
Ananthanarayanan et al.

(10) Patent No.: US 9,535,805 B2
(45) Date of Patent: Jan. 3, 2017

(54) RESILIENT ROUTING FOR SESSION INITIATION PROTOCOL BASED COMMUNICATION SYSTEMS

(75) Inventors: Krishnan Ananthanarayanan, Bothell, WA (US); Vijay Manian, Redmond, WA (US); Sankaran Narayanan, Redmond, WA (US); Dhigha Sekharan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1118 days.

(21) Appl. No.: 12/717,270

(22) Filed: Mar. 4, 2010

(65) Prior Publication Data

US 2011/0219121 A1 Sep. 8, 2011

(51) Int. Cl.
*G06F 15/16* (2006.01)
*G06F 11/20* (2006.01)
*H04L 29/08* (2006.01)

(52) U.S. Cl.
CPC ....... *G06F 11/2038* (2013.01); *G06F 11/2033* (2013.01); *H04L 67/1019* (2013.01); *H04L 67/1034* (2013.01); *H04L 67/1036* (2013.01); *G06F 11/2048* (2013.01)

(58) Field of Classification Search
CPC ............. H04L 67/1008; H04L 67/1019; H04L 67/1029; H04L 67/1031; H04L 67/1034; H04L 67/1036
USPC ................................. 709/227, 228, 229, 230
See application file for complete search history.

(56) References Cited

U.S. PATENT DOCUMENTS

| 6,470,389 | B1* | 10/2002 | Chung | H04L 29/06 709/227 |
| 7,310,802 | B2* | 12/2007 | Dani | H04L 12/1827 709/224 |
| 7,631,093 | B2 | 12/2009 | Sternagle | |
| 8,363,549 | B1* | 1/2013 | Zhu | H04L 63/0218 370/225 |
| 8,369,323 | B1* | 2/2013 | Desai | H04L 65/80 370/216 |
| 2006/0235980 | A1* | 10/2006 | Pote | H04L 29/06027 709/227 |
| 2007/0047571 | A1 | 3/2007 | Kandikonda et al. | |
| 2007/0136469 | A1 | 6/2007 | Nusbickel | |

(Continued)

FOREIGN PATENT DOCUMENTS

| CN | 101043373 A | 9/2007 |
| CN | 101159608 A | 4/2008 |

OTHER PUBLICATIONS

Rosenberg, et al., "Session Initiation Protocol (SIP): Locating SIP Servers", Retrieved at<<http://www.ietf.org/rfc/rfc3263.txt>>, Jun. 2002, pp. 16.
Hammer, et al., "Redundancy and Scalability in IMS", Retrieved at<<http://ieeexplore.ieee.org/stamp/stamp.jsp?arnumber=04082398>>, Mar. 23, 2006, pp. 6.

(Continued)

*Primary Examiner* — Dhairya A Patel
(74) *Attorney, Agent, or Firm* — Monica Adjemian; Douglas J. Barker; Micky Minhas

(57) ABSTRACT

Resilient routing management approaches are provided based on primary/backup and failover/failback relationships in a clustered network environment, where each user and/or resource is assigned to a primary cluster and at least one backup cluster. A distributed handover mechanism enables global knowledge of primary/backup relationships between clusters and their assigned users or resources.

19 Claims, 7 Drawing Sheets

(56) References Cited

U.S. PATENT DOCUMENTS

| | | | |
|---|---|---|---|
| 2008/0155310 A1 | 6/2008 | Langen et al. | |
| 2008/0235292 A1* | 9/2008 | Janin | G06F 17/30575 |
| 2009/0022145 A1* | 1/2009 | Bakshi | H04L 12/66 370/352 |
| 2009/0031032 A1 | 1/2009 | Shanmugham | |
| 2009/0093250 A1 | 4/2009 | Jackson et al. | |
| 2009/0097478 A1 | 4/2009 | Didcock et al. | |
| 2009/0245098 A1 | 10/2009 | Baker et al. | |
| 2010/0124163 A1* | 5/2010 | Qiu | H04L 65/1046 370/216 |
| 2010/0191856 A1* | 7/2010 | Gupta | H04L 61/1511 709/228 |
| 2011/0295957 A1* | 12/2011 | Ananthanarayanan | H04L 67/24 709/206 |
| 2013/0007505 A1* | 1/2013 | Spear | G06F 11/2025 714/4.11 |

OTHER PUBLICATIONS

"Understanding Backup and Recovery Basics for a Failover Cluster", Retrieved at<<http://technet.microsoft.com/en-us/library/cc771973.aspx>>, 2010, pp. 2.

Singh , et al., "Failover and Load Sharing in SIP Telephony", Retrieved at<<http://www1.cs.columbia.edu/~kns10/publication/sipload.pdf>>, Jan. 7, 2010, pp. 11.

Ayari, et al.,"On improving the Reliability of Cluster based Voice over IP Servers",Retrieved at << http://www.ece.cmu.edu/~koopman/dsn08/fastabs/dsn08fastabs_ayari.pdf>>, Jan. 7, 2010, pp. 2.

International Search Report, Mailed Date: Oct. 28, 2011, Application No. PCT/US2011/026947, Filed Date: Mar. 3, 2011, pp. 9.

First Office Action and Search Report Issued in Chinese Patent Application No. 201180012125.0, Mailed Date: Jun. 5, 2014, 14 Pages.

\* cited by examiner

RESILIENT ROUTING FOR SESSION INITIATION PROTOCOL BASED COMMUNICATION SYSTEMS

BACKGROUND

Fault tolerance and scalability are two important requirements for server based systems. In a typical system, a server owns resources (e.g. a user's log-in to the server or files stored on the server) and provides the ability to find a resource. For example a file server provides the ability for users to store files on the server and also provides the ability for a user to look up a file in the system. The latter operation requires the ability to find the file in the system given a unique file name. Traditional approaches to fault tolerance typically use the primary/backup failover/failback model to assign resources to clusters. In this architecture, there is typically a standby backup cluster that takes over from the primary cluster once the primary cluster becomes unavailable.

Enhanced communication systems providing multi-modal communications operate in a similar fashion to (sometimes the same) data exchange networks where designated servers and their backups provide services (e.g. routing of calls). Session Initiation Protocol (SIP) is a commonly used communication protocol between components of such systems. When primary-backup relationships are used to assign users to clusters of servers in an enhanced communication system, several challenges may have to be overcome. For example, when and how to assign a user to a primary cluster or its backup, communication between the primary and backup clusters to determine when the user is to be handed over to the backup and back to the primary cluster, and comparable ones.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a managing primary/backup and failover/failback relationships in a networked environment, where each user and/or resource is assigned to a primary cluster and at least one backup cluster. According to some embodiments, a distributed handover mechanism enables global knowledge of primary/backup relationships between clusters and their assigned users or resources.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
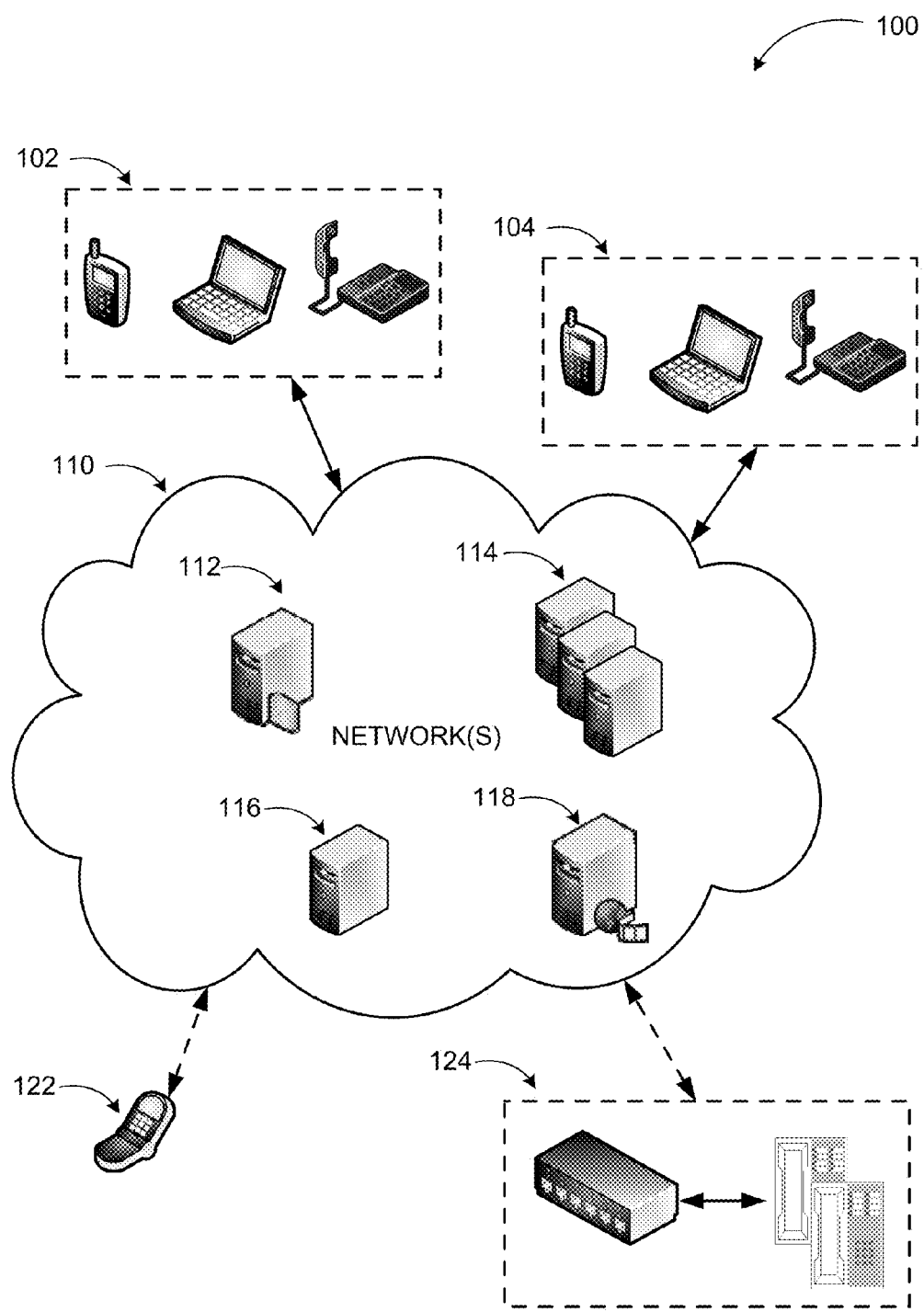
FIG. 1 is a diagram illustrating an example unified communications system, where embodiments may be implemented for managing routing of communication sessions through a primary/backup cluster architecture.

As briefly described above, primary/backup and failover/failback relationship may be managed in a distributed manner in enhanced communication systems and similar networked environments. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing multimodal communication systems or redundancy systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes diagram 100 illustrating an example unified communications system, where embodiments may be implemented for managing routing of communication sessions through a primary/backup cluster architecture. A unified communication system is an example of modern communication systems with a wide range of capabilities and services that can be provided to subscribers. A unified communication system is a real-time communications system facilitating instant messaging, presence, audio-video conferencing, web conferencing, and similar functionalities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

A UC system may provide a platform for multimodal communications. Clients in such a system are assigned home servers servicing communication requests from users. The home servers may be established as primary clusters with one or more backup clusters, each cluster having one or more physical/logic servers. When a communication request is received for a user at any server of the UC system, it is directed to the primary home server cluster initially. If that cluster is down, a designated backup cluster may be tried next. If the primary and the backup clusters are not available, alternative methods such as routing the request to PSTN may be attempted. More detailed examples are discussed below.

While the example system in FIG. 1 has been described with specific components such as mediation server, A/V server, and similar devices, embodiments are not limited to these components or system configurations and can be implemented with other system configuration employing fewer or additional components. Functionality of systems managing failover/failback operations in a primary/backup architecture may also be distributed among the components of the systems differently depending on component capabilities and system configurations. Furthermore, embodiments are not limited to unified communication systems. The approaches discussed here may be applied to any data exchange in a networked communication environment using the principles described herein.

Figure 2:
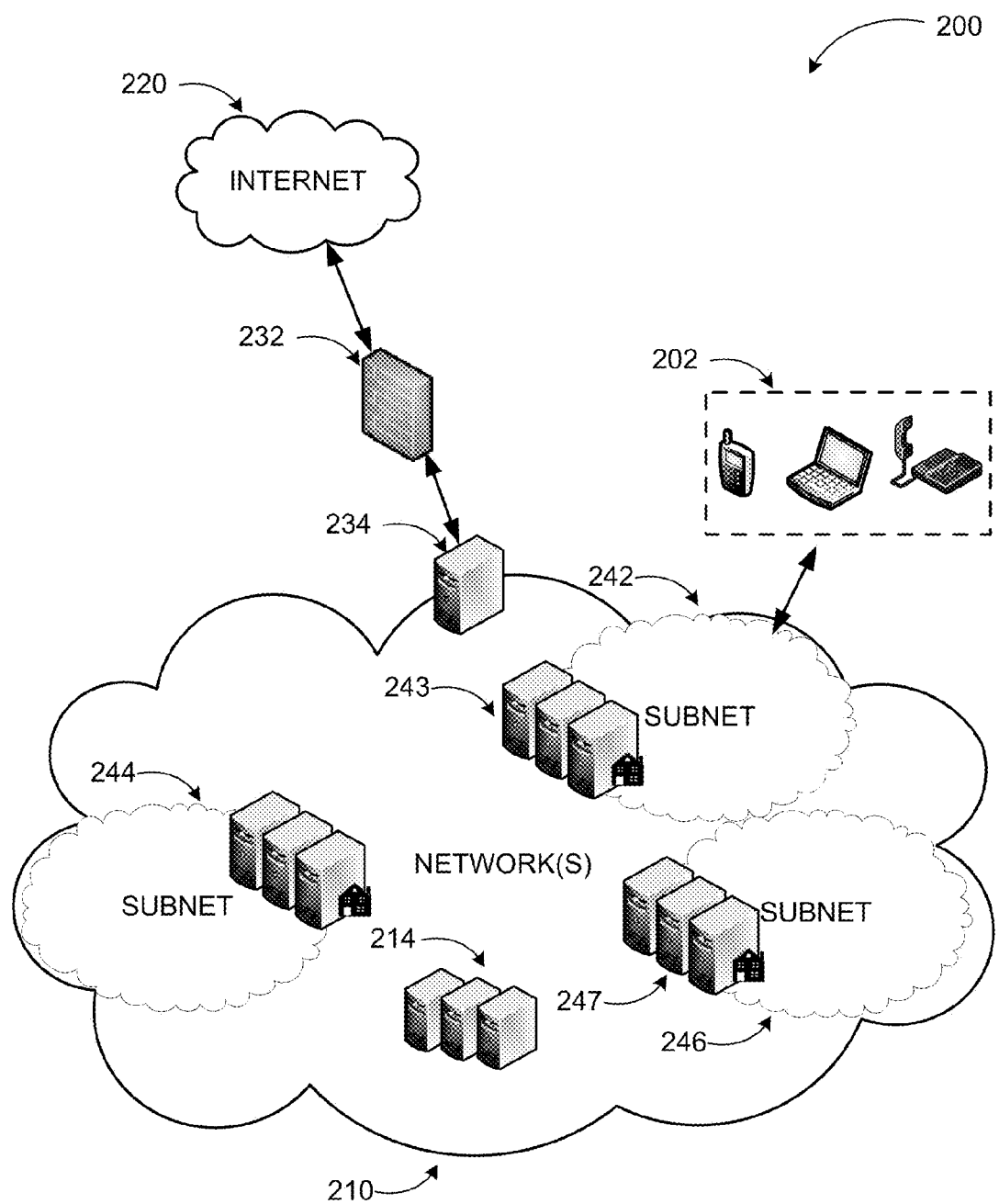
FIG. 2 is a conceptual diagram illustrating example primary and backup server clusters that may be managed in an architecture according to embodiments.

FIG. 2 is a conceptual diagram illustrating example primary and backup server clusters that may be managed in an architecture according to embodiments. Network 210 in diagram 200 is a UCN as discussed above. Network 210 may include a number of subnets such as subnets 242, 244, and 246. Network 210 may include one or more of the servers discussed above such as UC servers 214 and facilitate communication for clients 202.

Edge server 234 and firewall 232 are an example of a split access server functionality. Firewall 232 provides protection for connections with other networks such as Internet 220, while edge server 234 provides connectivity through the perimeter network. According to some embodiments, one or more edge servers may provide connectivity to clients connected to network 210 with clients through other networks. According to other embodiments, each subnet within network 210 may be equipped with one or more server clusters such as cluster 243 for subnet 242, cluster 247 for subnet 246 and so on. Of course, each subnet may include more than one server cluster. Some of these server clusters may be designated as home servers (or registrars) for assigned users. Thus, a request for communication with a particular user may be routed by any server that receives the request to the home server of that particular user. To prevent communication failure in cases where the primary home server of a user is down, one or more backups may be designated. In addition to the server clusters in the subnets, one or more of the UC servers 214 may also act as home servers to the clients of the system.

Automatic failover (a backup server taking over in response to a corresponding primary server going down) and failback (primary server taking over from the backup server) may happen via custom heart beats. A backup cluster may periodically send a server health monitoring message to the primary cluster. For example, the server health monitoring message may be a heartbeat message. The heartbeat request may be received by one of the servers in the primary cluster. The server receiving the request may respond to the request. A successful response to a heartbeat request may then be treated as an indication of the cluster being operational. As a result, a cluster may be considered to be active if at least one server in the cluster is active.

As an additional level of complexity, the backup cluster may potentially have multiple servers requiring all servers in the cluster to come to an agreement on the health of the primary cluster. Having each server in the backup cluster send a heartbeat to the primary cluster is undesirable because a number of total heartbeat messages may be relatively high (e.g. a cluster with 10 servers backing up to 500 other clusters may result in 5000 heartbeat messages per defined period). Furthermore, reaching a consensus is an inherently hard problem in a multi-master system. For example, two servers may have difficulty in coming to an agreement if the heartbeats from one server in the backup cluster fail, but the heartbeats from another server succeed.

To avoid complicating health check process, each server in the backup cluster may run the same algorithm to generate a sequence of servers. The input to the algorithm may be the fully qualified domain name of the primary cluster. The backup servers may then map the generated sequence to the list of active servers in the backup cluster. The first server in the sequence that is active may be responsible for sending heartbeat message to the primary cluster. Thus, the first server may take ownership of heartbeat transmission to the primary cluster, make the decision on the health, and distribute this information to other servers in the backup cluster. A periodicity of the heartbeat messages may be fixed.

Changing the health state based on the success or failure of a single heartbeat message may cause large swings. Hence, two thresholds (e.g. configurable by an administrator on a per primary-backup relationship) may be defined in a system according to embodiments. The first threshold (for failover interval may be the time duration after which a cluster is marked to be inactive. For example, if the heartbeat interval is 30 seconds and the failover interval is set to be 3 minutes, then six failed heartbeats cause the cluster to be marked as inactive. The second threshold may be the failback interval. This is the minimum amount of time that has to pass before a cluster is marked active again. For example, if the failback interval is 4 minutes, and a cluster is marked inactive at time t1, then it may not be marked to be active until (t1+4 minutes) even if heartbeats start succeeding during this window.

According to further embodiments, a mechanism may be provided for an administrator to disable automatic failover. When this option is set, the backup cluster may always assume that the primary cluster is active since automatic failover has been disabled. As a consequence, if the primary cluster goes down, users assigned to the primary cluster as their home cluster may not be able to get service from the backup cluster.

As a result of the above described automated mechanism, the backup cluster may detect the primary cluster going down/coming up automatically without any manual intervention. It also provides the administrator the flexibility to set the intervals depending on the network characteristics of the primary cluster and to disable automatic failover/failback. According to some embodiments, clusters may be configured to be backups of each other or a primary cluster may be assigned multiple backup clusters (in a predefined order).

According to an example scenario, if the primary cluster for a user goes down, the user's clients may try to connect to the backup cluster. Once the backup cluster detects that the primary is down, it may start servicing these users. The primary cluster being down may also be detected by other servers and route the traffic to the backup cluster. When the backup cluster detects that the primary cluster is active, it may move users over to the primary cluster. This may be accomplished via SIP protocol. The backup cluster may send a message to the user's client applications asking them to move over to the primary cluster. Client applications may then disconnect from the backup cluster and re-connect to the primary cluster to be serviced there.

When a server receives a request targeted at a given user, the server may fall into one of the three following categories: (1) the server may be in the primary cluster of the user; (2) the server may be in the backup cluster of the user; or (3) the server may be neither in the primary nor the backup cluster of the user. A cluster receiving the request may pursue the following sequence of steps: look up the primary cluster of the user; lookup the backup cluster of the primary cluster; check if the cluster processing the request is either in the primary cluster or the backup cluster. If the cluster is neither the primary nor the backup cluster, the cluster may first attempt to forward the request to the primary cluster. If that succeeds, then the processing on this server is complete and the primary cluster may process the request. If the attempt to forward the request to the primary cluster fails, the receiving cluster may attempt to forward the request to the backup cluster of the user. Again if the backup is active and accepts the request, then the processing is complete. If neither the primary nor the backup clusters can be reached, the receiving cluster may check to see if any alternate mechanisms can be used to contact the user. For example, a voice call may be tried over PSTN or directed to voicemail.

If an alternate mechanism exists for the request, the receiving server may use that mechanism to contact the user. If no alternate mechanism exists, the request may be failed as no further action can be taken to reach the user. If the receiving cluster is the primary cluster of the user, it may accept the request for further processing. If the cluster is the backup cluster of the user, it may first forward the request to the primary cluster of the user. If the primary cluster accepts the request, then the processing is complete on the receiving cluster. If the attempt to contact the primary cluster fails, then the receiving backup cluster may accept the request for further processing, since the primary is not reachable and the receiving cluster is the backup.

It should be noted that the above described approach may be employed at each server through which the message travels. Thus if cluster A cannot reach the primary cluster of user X, it may attempt to send it to the designated backup cluster. But if the primary cluster is reachable from the backup cluster (i.e. network is partitioned), then the message may be routed to the primary cluster of the user. If an attempt to contact a given cluster fails for the cluster being down, network outages, network partitioning, or the request being rejected by the target cluster due to bandwidth constraints, the process may proceed to the next step.

If a user calls another user whose primary cluster is down, the call connection may be delayed because a system according to some embodiments tries the primary cluster, the backup cluster, and the alternate mechanisms serially. To enhance user experience and to take advantage of the information from previous attempts to contact a given cluster, the approach may be augmented by maintaining a cache containing entries for each cluster that has been tried in the past.

Thus, according to further embodiments a cache of up and down clusters may be maintained. A cluster may be designated as "down" in the cache after a predefined number of failed attempts. In an enhanced communication system, the cache may not be used for non-audio modalities like instant messaging since user expectation typically does not include prompt connection. For modalities like audio communication, however, the above discussed approach may be optimized and accelerated with the help of the cache.

Figure 3:
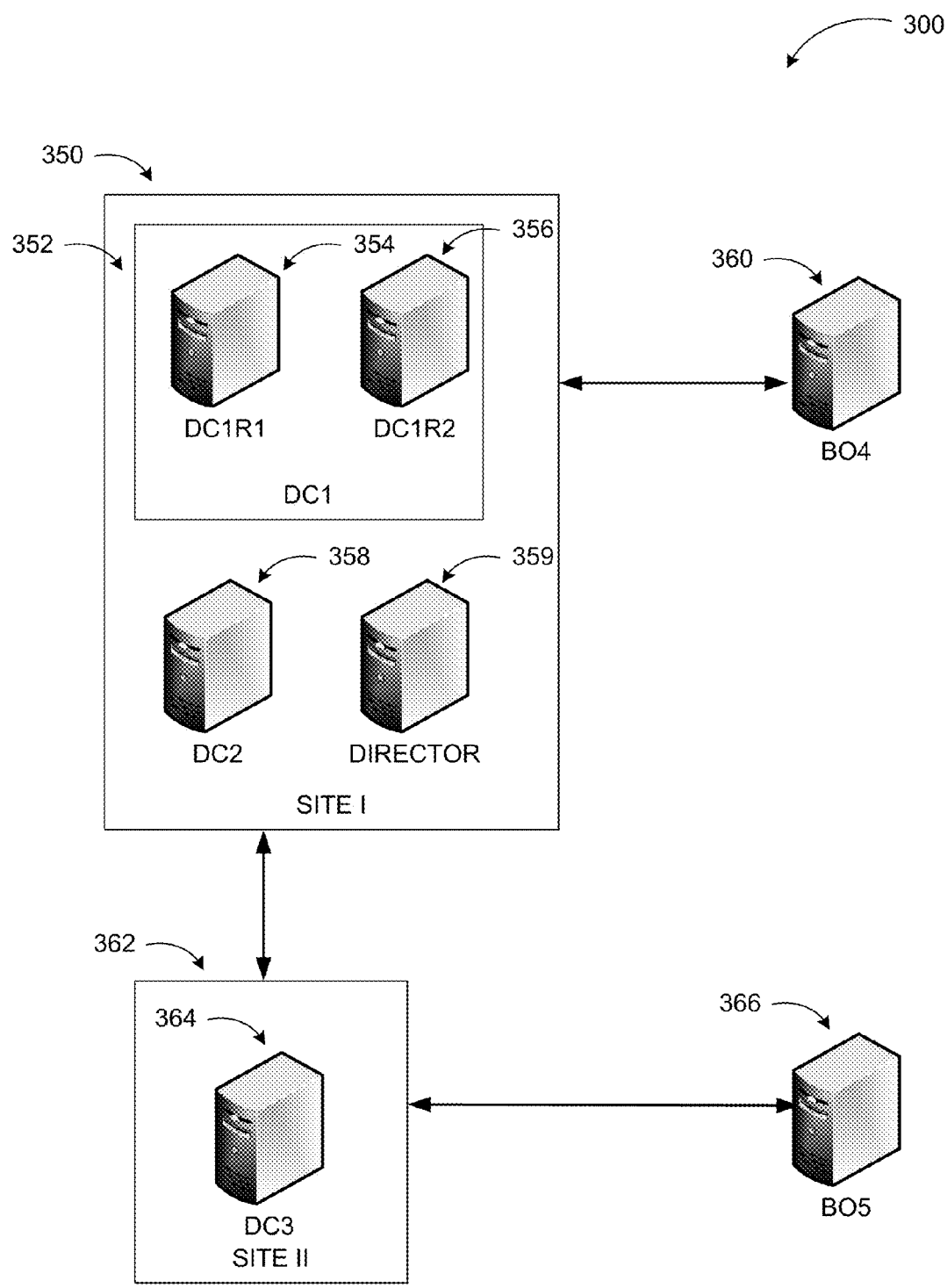
FIG. 3 is a conceptual diagram illustrating an example inter-cluster topology.

FIG. 3 is a conceptual diagram illustrating an example inter-cluster topology. The example topology shown in diagram 300 includes two sites 350 and 362. DC1 (352), DC2 (358), and DC3 (364) are data center clusters. Some of the clusters (DC2 and DC3) include only one physical server, while DC1 (352) has two physical servers, DC1R1 (354) and DC1R2 (356), both of which may be registrars (home servers). In an enhanced communication system such as a UC system, each user may be assigned a preferred registrar. An example scenario is displayed below in table 1.

Clusters B04 (360) and B05 (366) may be the respective branch office registrars for the sites I and II (350, 362). Server 359 may manage operations of site I (350). According to an example scenario, the clusters and servers of the illustrated topology may be configured as:

TABLE 1

Example configuration of primary and backup servers for various users.

| Registrar Cluster | Presence Cluster | Backup Cluster | Users |
|---|---|---|---|
| DC1 | DC1 | DC2 | U1, U1R1, U1R2 |
| DC2 | DC2 | DC1 | U2 |
| DC3 | DC3 | — | U3 |
| BO4 | DC1 | DC1 | U4 |
| BO5 | DC2 | DC2 | U5 |

According to the example scenario, cluster DC2 is the designated backup cluster to cluster DC1 for users U1, U1R1, and U1R2. For user U2, cluster DC2 is the primary registrar and cluster DC1 is the backup. For user U3, cluster DC3 is the primary with no backup cluster designated. For users U4 and U5, branch office registrars B04 and B05 are the designated primary registrar clusters, while clusters DC1 and DC2 are the primary presence registrars. For both users, DC1 and DC2 are also the backup clusters. Thus, for calls directed at the listed users, the respective primary clusters may be tried first, followed by their respective backup clusters if the attempts fail as discussed above.

Figure 4:
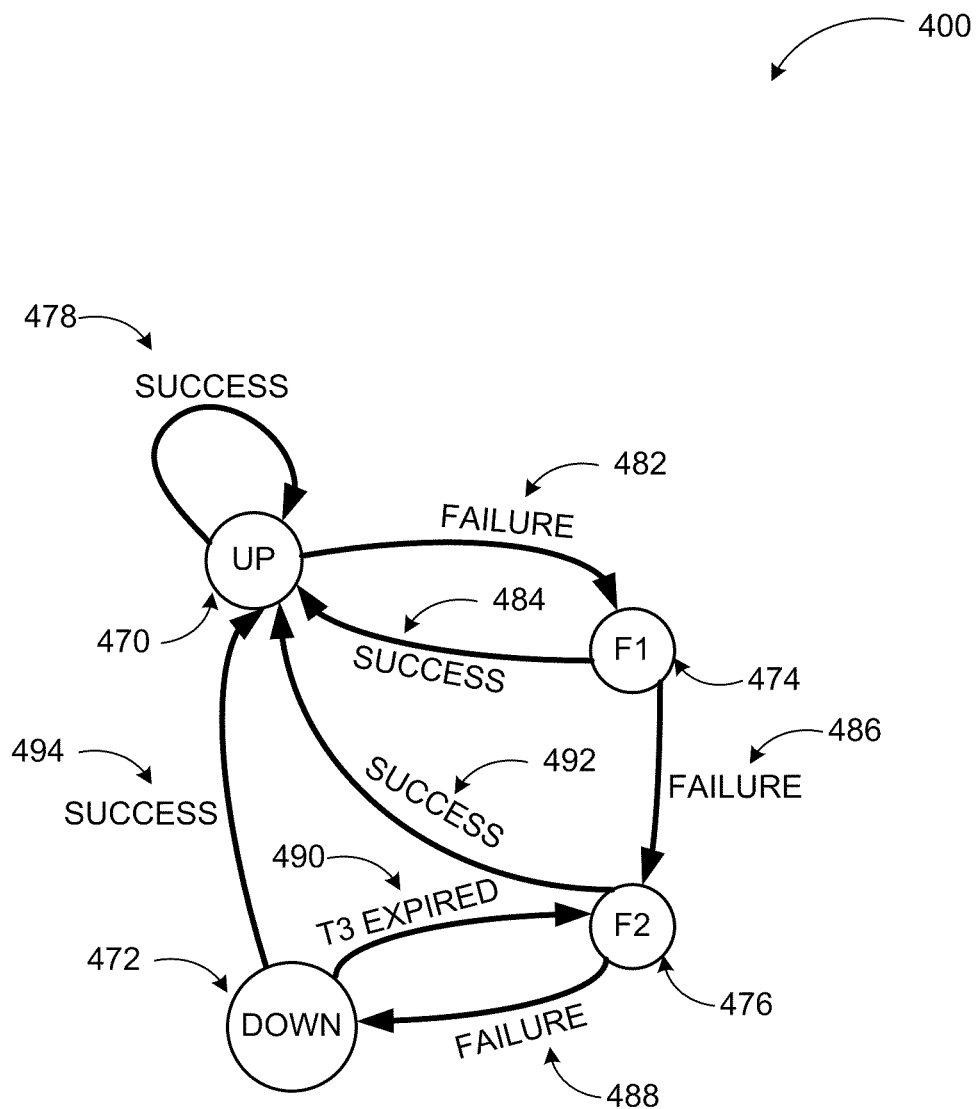
FIG. 4 is a state diagram for attempts in routing communication sessions in an enhanced communications system according to embodiments.

FIG. 4 is a state diagram for attempts in routing communication sessions in an enhanced communications system according to embodiments. As discussed previously, an internal up or down state cache may be maintained (e.g. by an Inter-Cluster Routing "ICR" module) to optimize routing in an enhanced communication system implementing resilient routing according to embodiments.

In diagram 400, a routing attempt may be considered a failure (482, 486) and marked as "DOWN" 472 if the primary cluster response timer or the backup cluster response timer for that cluster expires (474 or 476, respectively). Any response received (478, 484, 492) may be considered success and marked as "UP" 470. According to some embodiments, a predefined number of successive failures (e.g. 482, 486, 488) to route may result in a cluster being marked as "DOWN" 472. Once a cluster is marked "DOWN", the ICR may continue to try to route non-audio invites to that cluster and any success (494) on these attempts may bring the cluster's state back to "UP" 470. If a cluster was marked as "DOWN" 472 more than a predefined period of time (490), the ICR may make one attempt to route an audio call to that cluster.

The example systems in FIGS. 1, 2, and 3 have been described with specific components such as communication servers, directory servers, presence servers, and the like, embodiments are not limited to communication systems according to these example configurations. A resilient routing system according to embodiments may be implemented in configurations employing fewer or additional components and performing other tasks.

Furthermore, embodiments are not limited to enhanced communication systems. Primary/backup based failover/failback management may be implemented in other types of networks, where users and/or resources are managed by servers and server groups using the principles described herein.

Figure 5:
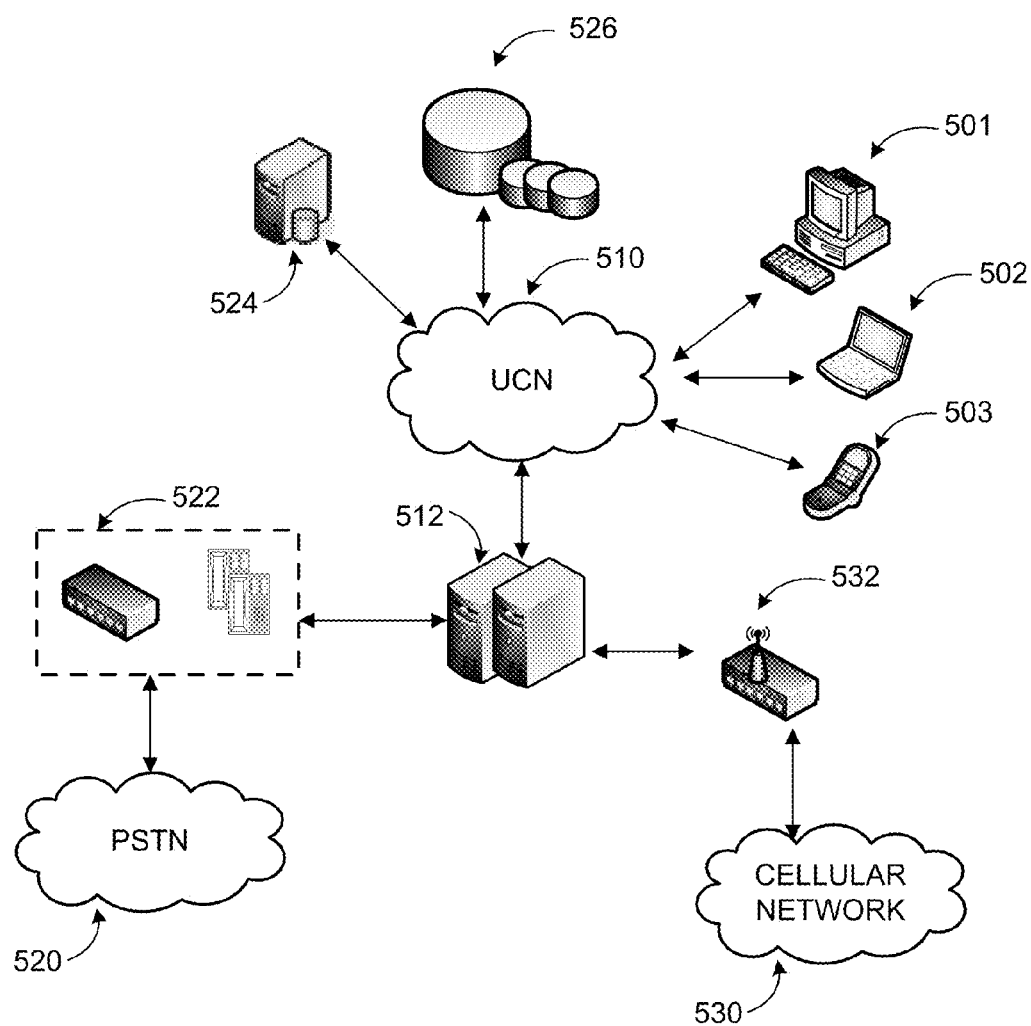
FIG. 5 is a networked environment, where a system according to embodiments may be implemented.

FIG. 5 is an example networked environment, where embodiments may be implemented. Primary/backup cluster architecture based failover/failback routing as described previously may be implemented locally or in a distributed manner over a number of physical and virtual clients and servers. Such a system may typically involve one or more networks such as PSTN 520, cellular network 530, and UCN 510. At least one of the systems may be implemented in un-clustered systems or clustered systems employing a number of nodes communicating over one or more networks.

A system according to embodiments may comprise any topology of servers, clients, Internet service providers, and communication media. Also, the system may have a static or dynamic topology. The term "client" may refer to a client application or a client device. A system according to embodiments may involve many more components, typical and relevant ones are discussed in conjunction with this figure.

Mediation server(s) 512 may provide signaling and media exchange between the different systems. A PBX 522 and an RF modem 532 may be used for connection between the PSTN and the cellular networks, respectively, and the mediation server(s) 512. Client devices 501, 502, 503 communicate with each other and with devices on other networks through UCN 510. The UC system may also include a one or more specialized or combination servers (not shown) for presence, routing, and other functionalities.

Home server(s) 514 may be assigned to client devices 501-503 as primary and/or backup clusters. Each backup cluster may determine the health of a corresponding primary cluster as discussed above and route requests according to various approaches described herein. A primary cluster may have one or more backup clusters. Moreover, primary and backup clusters may have reversed roles for each other. If alternative mechanisms are exhausted during a failback routing attempt, a call may be routed back to PSTN 520 or cellular network 530.

Client devices 501-503 and the servers of the system may communicate through SIP in routing requests through one or more backup clusters. Data associated with the system configuration (e.g. user names, phone numbers, call policies, configuration, records, etc.) and other network related operations may be stored in one or more data stores such as data stores 526, which may be directly accessed by the servers and/or clients of the system or managed through a database server 524. UCN 510 provides the backbone of the UC system and may employ a number of protocols such as SIP, RTP, and the like. Client devices (e.g. 501-503) provide platforms for UCN user end points. Users may access the communication system using a client device or one or more client applications running on a client device.

UCN 510 provides communication between the nodes described herein. By way of example, and not limitation, UCN 510 may include wired media such as a wired network or direct-wired connection, and wireless media such as acoustic, RF, infrared and other wireless media.

Many other configurations of computing devices, applications, data sources, data distribution systems may be employed to implement resilient routing. Furthermore, the networked environments discussed in FIG. 5 are for illustration purposes only. Embodiments are not limited to the example applications, modules, or processes.

Figure 6:
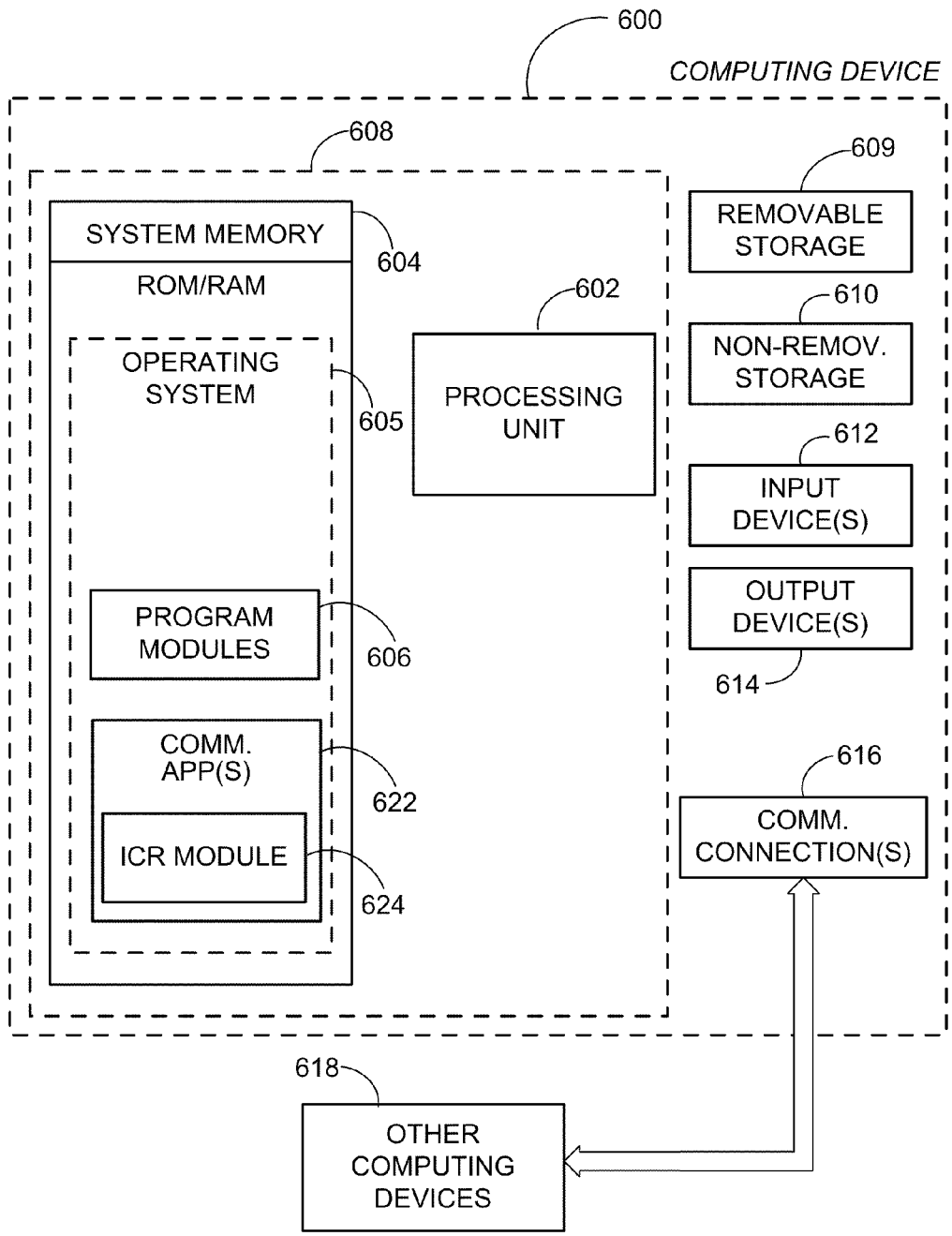
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server managing a communication application or service and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication application 622, and inter-cluster routing (ICR) module 624.

Communication application 622 may be any application that facilitates communication between client applications and servers relevant to an enhanced communication system. ICR module 624 may maintain a cache for up and down states of relevant primary and backup clusters to optimize routing according to the mechanism described above. ICR module 624 and communication application 622 may be separate applications or integral modules of a hosted service that provides enhanced communication services to client applications/devices. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
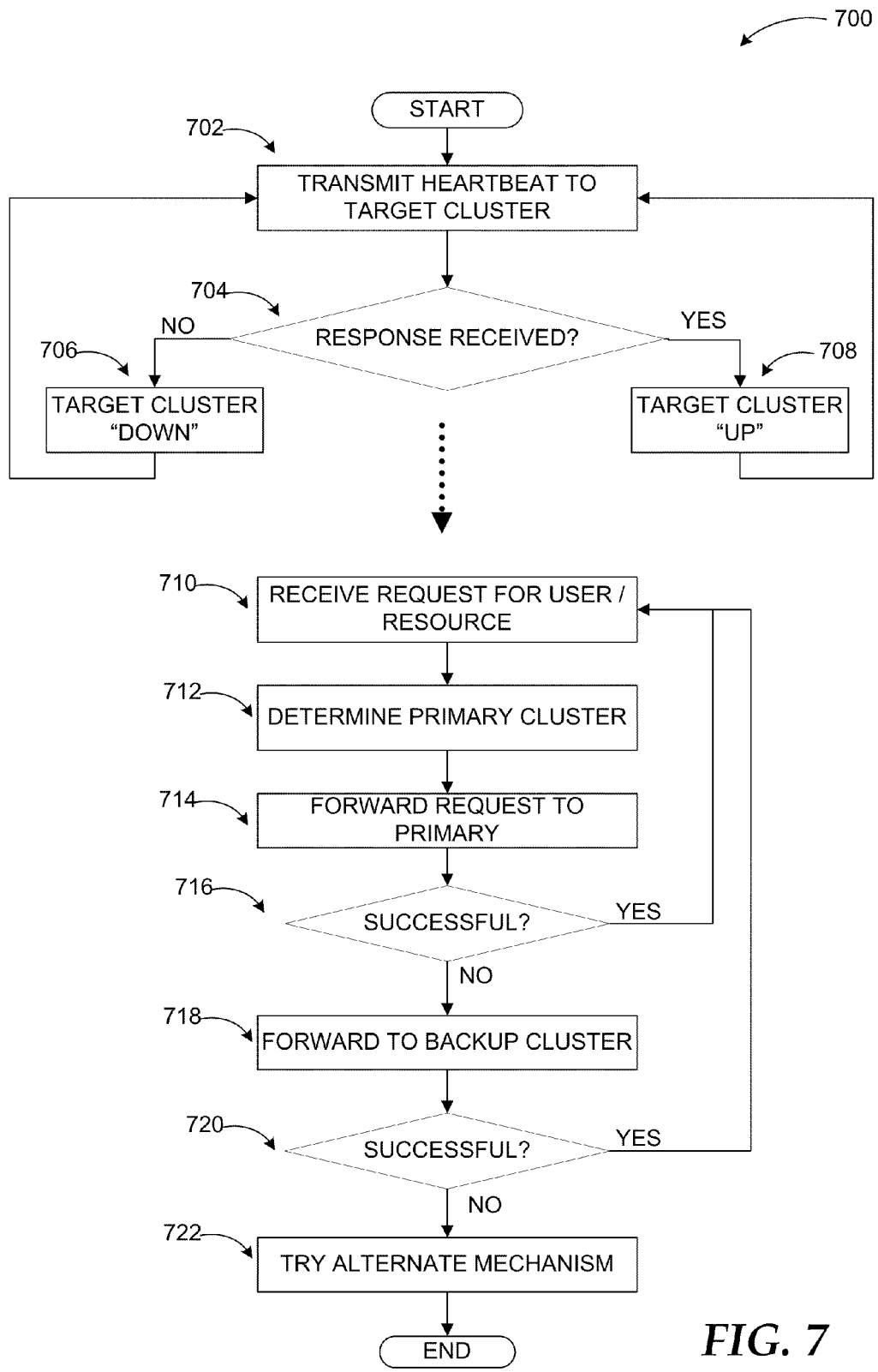
FIG. 7 illustrates a logic flow diagram for a process of managing resilient routing in enhanced communication systems with a primary/backup cluster architecture according to embodiments.

FIG. 7 illustrates a logic flow diagram for a process 700 of managing resilient routing in enhanced communication systems with a primary/backup cluster architecture according to embodiments. Process 700 may be implemented as part of an enhanced communication system.

Process 700 includes two parts. The first part is associated with determining the health of a cluster. During regular operations, clusters (e.g. backup clusters and primary clusters) in an enhanced communication system may exchange heartbeat messages to determine each other's health as discussed previously. Thus, the first part begins with operation 702, where a heartbeat message is transmitted from one of the servers of a cluster (e.g. backup cluster) to another cluster (e.g. primary cluster). If a response is received within a predetermined time from any of the servers of the target cluster, a decision may be made (operation 704) to mark the target cluster as "UP" at operation 706. On the other hand, if a response is not received within the predefined time, a decision may be made (operation 704) to mark the target cluster as "DOWN" at operation 708.

The time thresholds for the decision may be defined as two distinct thresholds in determining whether a cluster is active or not depending on the previous state of the target cluster (i.e. whether the cluster was already "UP" or "DOWN"). Thus, two different thresholds may be employed for failover checks and failback checks. The heartbeat based checks may be performed during operations and a cache of cluster statuses may be maintained. Alternatively, clusters may be contacted at the time of routing as described below.

The second portion of process 700 begins upon receipt of a request associated with a user or resource (e.g. call request for a user, access request for a stored file, etc.) at a cluster of the system at operation 710. The receiving cluster may be the primary cluster for the user/resource, the backup cluster, or neither of those two. At operation 712, the receiving cluster determines the primary cluster assigned to the user. If the receiving cluster is the primary cluster (and it is active since it is receiving the request), the request may be processed at the receiving cluster. If the receiving cluster is not the primary cluster, however, an attempt may be made to forward the request to the designated primary cluster at operation 714.

At decision operation 716, a determination is made whether the attempt to forward the request to the primary cluster was successful. If the attempt was successful, the request is processed by the primary cluster and processing returns to operation 710 for receipt of further requests. If the forwarding was unsuccessful, processing moves to operation 718, where another attempt is made to forward the request to a backup cluster for the designated primary cluster.

At decision operation 720, a determination is made whether the attempt to forward the request to the backup cluster was successful. If the attempt was successful, the request is processed by the backup cluster and processing returns to operation 710 for receipt of further requests. If the forwarding was unsuccessful, processing moves to operation 722, where an alternate mechanism such as forwarding a call request to voicemail through PSTN may be tried. According to other embodiments, multiple backup clusters may be assigned to the primary cluster. In that case, operations 718 and 720 may be repeated as many times as the number of backup clusters.

The operations included in process 700 are for illustration purposes. Managing failover/failback operations in a primary/backup cluster architecture according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for managing routing of a request in a networked system with a failover/failback architecture, the method comprising:

receiving a request, at a home server of a cluster of the system, wherein the home server of the cluster is configured to provide presence functionality;

determining, at the home server of the cluster, a primary cluster assigned to a user and a resource associated with the request;

attempting to forward the request through a routing server of the cluster to a home server of the primary cluster for processing;

executing an algorithm of the primary cluster at a routing server of a backup cluster to manage the request such that a sequence of servers in the backup cluster is generated, the generated sequence is mapped to a list of active servers in the backup cluster, and a first active server in the sequence transmits a server health monitoring message to a servers of the primary cluster, determines a health of the primary cluster based on if a response to the server health monitoring message is received from the servers of the primary cluster, and distributes the determined health to other servers in the backup cluster, wherein an input of the algorithm is a domain name of the primary cluster;

in response to detecting a failure of the attempt to forward the request to the home server of the primary cluster, attempting to forward the request through the routing server of the cluster to a home server of the backup cluster assigned to the primary cluster; and in response to detecting a failure of the attempt to forward the request to the home server of the backup cluster and in response to detecting an alternative mechanism for processing the request, employing at the home server of the cluster, the alternative mechanism, wherein skipping, by the home server of the cluster, an attempt to forward the request to a home server of another cluster based on one of: the other cluster being inactive, a network outage, a network partitioning, and a rejection from the other cluster due to bandwidth constraints.

2. The method of claim 1, further comprising:

in response to detecting that the request is received at the home server of the primary cluster assigned to one of the user and the resource associated with the request:
processing the request at the home server of the primary cluster;

in response to detecting that the request is received at the home server of the backup cluster assigned to the primary cluster:
attempting to forward the request through the routing server of the backup cluster to the home server of the primary cluster, and
in response to a failure of the attempt, processing the request at the home server of the backup cluster; and in response to detecting that the request is received at a home server of another cluster that is neither the primary cluster nor the backup cluster:
attempting to forward the request through a routing server of the other cluster to the home server of the primary cluster, and
in response to a failure of the attempt, attempting to forward the request through the routing server of the other cluster to the home server of the backup cluster.

3. The method of claim 1, further comprising:

in response to detecting that the request is to be forwarded to one of the home server of the primary cluster and the home server of the backup cluster, notifying, by the home server of the cluster, a client originating the request via a Session Initiation Protocol (SIP) message to reconnect to the active one of the primary cluster and the backup cluster.

4. The method of claim 1, further comprising:
maintaining, by the home server of the cluster, a cache of active and inactive clusters; and
employing, by the home server of the cluster, the cache in optimizing the forwarding of the request.

5. The method of claim 1, wherein an attempt to forward is deemed as failed upon one of: expiration of a predefined time period for the response to the transmitted server health monitoring message and a predefined number of attempts to contact.

6. The method of claim 1, wherein a plurality of clusters are designated as backup clusters to the primary cluster based on a type of task to be performed by the primary cluster.

7. The method of claim 1, further comprising:
determining, by the home server of the cluster, at least one backup cluster assigned to the primary cluster.

8. The method of claim 7, further comprising:
in response to detecting a failure of the attempt to forward the request to the backup cluster, attempting to forward the request through the routing server of the cluster to a home server of another backup cluster assigned to the primary cluster.

9. The method of claim 1, further comprising determining the health of the primary cluster by:
in response to detecting that a response is received from any server of the primary cluster within a first time period, designating, by the first active server in the sequence of servers in the backup cluster, the primary cluster as active, else
designating, by the first active server, the primary cluster as inactive.

10. The method of claim 9, further comprising:
transmitting, by the first active server in the sequence of servers in the backup cluster, another server health monitoring message to servers of the primary cluster that are designated as inactive; and
in response to detecting that a response is received from any server of the primary cluster within a second time period, modifying, by the first active server, the designation of the primary cluster to active, else
leaving, by the first active server, the designation of the primary cluster as inactive.

11. The method of claim 10, wherein the first and second time periods are determined based on one of: network conditions and an administrator input.

12. An enhanced communication system for managing call routing employing a failover/failback architecture, the system comprising:
a processor;
a memory;
a primary cluster comprising a plurality of servers, each server comprising a communication module, a memory, and one or more processors, wherein a home server of the primary cluster is configured to:
process a call request for an assigned user associated with the call request, wherein the home server of the cluster is configured to provide presence functionality;
a backup cluster comprising another plurality of servers, each server comprising a communication module, a memory and one or more processors, wherein a routing server of the backup cluster is configured to:
execute an algorithm of the primary cluster to manage the call request such that a sequence of backup cluster servers in the backup cluster is generated by the algorithm, the generated sequence is mapped to a list of active servers in the backup cluster, and a first active backup server transmits a server health monitoring message to the primary cluster, determines a health of the primary cluster based on if a response to the server health monitoring message is received from the primary cluster, and distributes the determined health to other backup cluster servers in the backup cluster, wherein an input of the algorithm is a domain name of the primary cluster;
wherein a home server of the backup cluster is configured to determine, whether the primary cluster is active, and
in response to determining that the primary cluster is inactive, process the call request for the assigned user; and
a receiving cluster comprising a further plurality of servers, each server comprising a communication module, a memory, and one or more processors, wherein a home server of the receiving cluster is configured to:
receive the call request;
determine the primary cluster for the user;
attempt to forward the request through a routing server of the cluster to the home server of the primary cluster for processing;
in response to a failure of the attempt, attempt to forward the request through the routing server of the cluster of the home server of the backup cluster assigned to the primary cluster; and
in response to a failure of the attempt to forward the request to the home server of the backup server and in response to a determination that an alternative mechanism for processing the request exits, employ the alternative mechanism, wherein skipping, by the home server of the cluster, an attempt to forward the call request to a home server of another cluster based on one of: the other cluster being inactive, a network outage, a network partitioning, and a rejection from the other cluster due to bandwidth constraints.

13. The system of claim 12, wherein the alternative mechanism is one of:
routing the call request over Public Switched Telephone Network (PSTN) and routing the call request to a voicemail associated with the user.

14. The system of claim 12, wherein a failover response time threshold and a failback response time threshold are employed to determine whether the primary cluster is active.

15. The system of claim 14, wherein an administrator is enabled to adjust the failover response time threshold and the failback response time threshold, and disable a failover transfer to the backup cluster.

16. The system of claim 14, wherein the failover response time threshold and the failback response time threshold are determined based on a modality of a requested communication.

17. A computer-readable storage device with instructions stored thereon for managing call routing employing a failover/failback architecture in an enhanced communication system, the instructions comprising:
receiving a call request for a subscriber of the system at a home server of a cluster of the system, wherein the home server of the cluster is configured to provide presence functionality;
determining, by the home server of the cluster, a primary cluster assigned to the subscriber;

executing an algorithm of the primary cluster at a routing server of a backup cluster to manage the request such that a sequence of servers in the backup cluster is generated, the generated sequence is mapped to a list of active servers in the backup cluster, and a first active server in the sequence transmits a server health monitoring message to servers of the primary cluster, determines a health of the primary cluster based on if a response to the server health monitoring message is received from the servers of the primary cluster, and distributes the determined health to other servers in the backup cluster, wherein an input of the algorithm is a domain name of the primary cluster;

in response to determining that the cluster is the assigned primary cluster, processing, by the home server of the cluster, the call request at the cluster; else attempting to forward the request through a routing server of the cluster to a home server of the primary cluster for processing;

in response to a failure of the attempt, determining, by the home server of the cluster, the backup cluster assigned to the primary cluster;

in response to determining that the cluster is the assigned backup cluster, processing, by the home server of the cluster, the call request at the cluster; else attempting to forward the request through the routing server of the cluster to a home server of the backup cluster assigned to the primary cluster; and in response to a failure of the attempt to forward to the backup cluster fails and in response to determining that an alternative mechanism for processing the request exists, employing by the home server of the cluster, the alternative mechanism, wherein skipping, by the home server of the cluster, an attempt to forward the call request to a home server of another cluster based on one of: the other cluster being inactive, a network outrage, a network partitioning, and a rejection from the other cluster due to bandwidth constraints.

18. The computer-readable storage device of claim 17, wherein the instructions further comprise: maintaining, by the home server of the cluster, a cache of active and inactive clusters; and employing, by the home server of the cluster, the cache in determining a cluster forwarding the call request to.

19. The computer-readable storage device of claim 17, wherein the attempts to forward the request to the home server of the primary cluster and the home server of the backup cluster are deemed to be failed based on expiration of a predefined time period that is determined based on a modality of the requested call.

* * * * *